United States Patent
Choi et al.

(10) Patent No.: US 8,681,903 B2
(45) Date of Patent: Mar. 25, 2014

(54) METHOD FOR DEMODULATING RECEIVED SIGNALS AND APPARATUS FOR PERFORMING THE SAME

(75) Inventors: Hyung-Jin Choi, Songpa-gu Seoul (KR); Young-Il Min, Suwon-si Gyeonggi-do (KR); Se-Bin Im, Suwon-si Gyeonggi-do (KR)

(73) Assignee: Sungkyunkwan University Foundation for Corporate Collaboration, Suwon-si (KR)

( * ) Notice: Subject to any disclaimer, the term of this patent is extended or adjusted under 35 U.S.C. 154(b) by 187 days.

(21) Appl. No.: 13/388,848

(22) PCT Filed: Aug. 4, 2010

(86) PCT No.: PCT/KR2010/005106
§ 371 (c)(1),
(2), (4) Date: Feb. 3, 2012

(87) PCT Pub. No.: WO2011/016670
PCT Pub. Date: Feb. 10, 2011

(65) Prior Publication Data
US 2012/0134453 A1   May 31, 2012

(30) Foreign Application Priority Data
Aug. 4, 2009  (KR) .................. 10-2009-0071521

(51) Int. Cl.
*H04L 27/06* (2006.01)
(52) U.S. Cl.
USPC ........... 375/340; 375/295; 375/316; 375/322; 375/341; 375/347

(58) Field of Classification Search
USPC ......... 375/260, 271, 295, 299, 316, 324, 329, 375/340, 341, 343, 347–350
See application file for complete search history.

(56) References Cited

U.S. PATENT DOCUMENTS 7,126,996 B2 * 10/2006 Classon et al. ............... 375/260
7,327,800 B2 *  2/2008 Oprea et al. ................. 375/267

(Continued)

FOREIGN PATENT DOCUMENTS

| KR | 10-2006-0031377 A | 4/2006 |
| KR | 10-2007-0065010 A | 6/2007 |
| KR | 10-2008-0069753 A | 7/2008 |
| KR | 10-2009-0026965 A | 3/2009 |

OTHER PUBLICATIONS

International Search report issued Mar. 2, 2011, in counterpart International Application No. PCT/KR2010/005106 (4 Pages, including English translation).

*Primary Examiner* — Hirdepal Singh
(74) *Attorney, Agent, or Firm* — NSIP Law

(57) ABSTRACT

Disclosed are a method for demodulating received signals and an apparatus therefore which can maintain quality of signals and can reduce computational complexity. A demodulation method of a receiving device for receiving a plurality of signals modulated through a M-ary (M is a natural number of 1 or more) modulation method includes: comparing channel frequency response power of a first channel with channel frequency response power of a second channel, selecting M reference signals on the basis of the compared result, selecting corresponding signals paired with respective selected M reference signals, and estimating transmitting signals from the M signal pairs including pairs of the reference signal and the corresponding signal. Accordingly, the computational complexity is reduced from $O(M^2)$ to $O(M)$.

10 Claims, 10 Drawing Sheets

(56) References Cited

U.S. PATENT DOCUMENTS

| | | | |
|---|---|---|---|
| 8,145,252 B2* | 3/2012 | Sung et al. | 455/522 |
| 8,149,905 B1* | 4/2012 | Cheng et al. | 375/224 |
| 8,179,775 B2* | 5/2012 | Chen et al. | 370/203 |
| 8,238,507 B2* | 8/2012 | Sheu et al. | 375/376 |
| 8,379,773 B2* | 2/2013 | Krasny et al. | 375/341 |
| 8,385,488 B2* | 2/2013 | Choi et al. | 375/347 |
| 2009/0129496 A1 | 5/2009 | Zhang et al. | |
| 2010/0232491 A1* | 9/2010 | Hayashi | 375/229 |
| 2010/0274561 A1* | 10/2010 | Ahgren et al. | 704/226 |
| 2012/0281789 A1* | 11/2012 | Kolze | 375/340 |

* cited by examiner

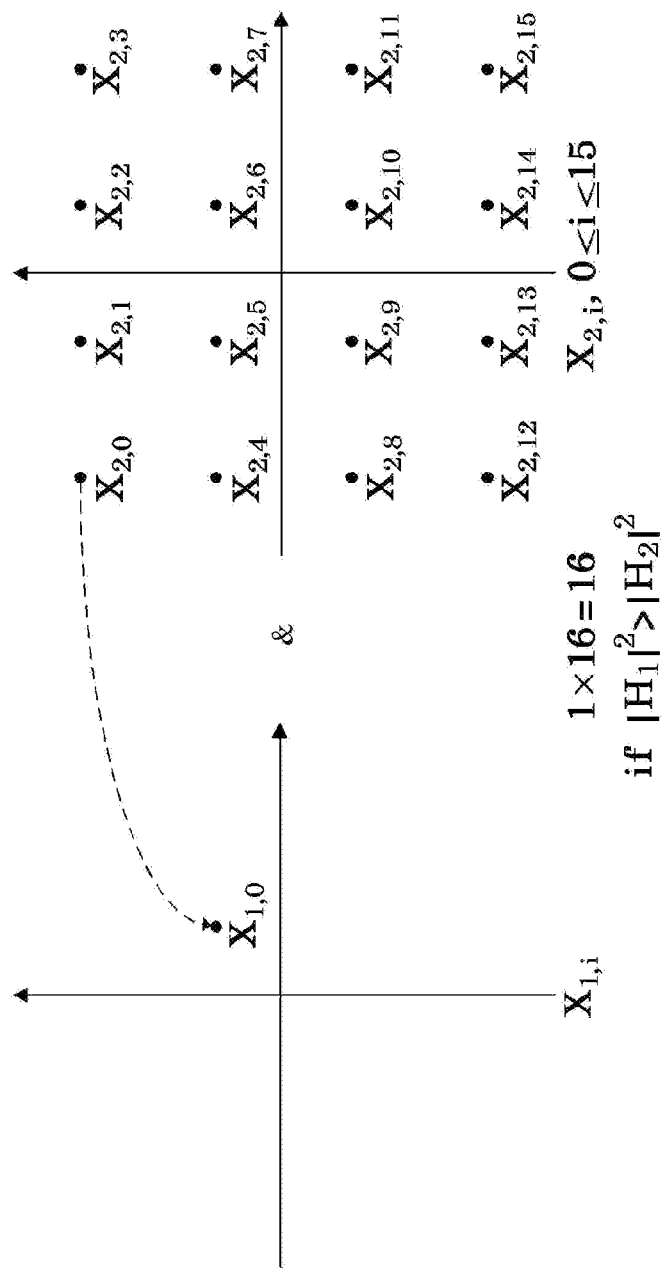

METHOD FOR DEMODULATING RECEIVED SIGNALS AND APPARATUS FOR PERFORMING THE SAME

CLAIM FOR PRIORITY

This application claims priority to Korean Patent Application No. 2009-0071521 filed on Aug. 4, 2009 in the Korean Intellectual Property Office (KIPO), the entire contents of which are hereby incorporated by reference.

BACKGROUND

1. Technical Field

Example embodiment's of the present invention relates to the demodulation of received signals and, more specifically, to methods of demodulating received signals, which may be applied to a reception apparatus for receiving a signal having one or more signals mixed therein, and apparatuses for performing the method.

2. Description of the Related Art

A relay cooperative communication system using Complex Field Network Coding (CFNC) is advantageous in that it has more improved throughput than a relay cooperative communication system using Galois Field Network Coding (GFNC) or a relay cooperative communication system not using a network coding system because the number of time slots necessary for communication is small.

More particularly, the relay cooperative communication system using CFNC requires only two time slots for transmission and reception. In the first time slot, a Relay Station (RS) simultaneously receives signals transmitted from an eNB and User Equipment (UE), and in the second time slot, the RS simultaneously transmits a signal using CFNC to the eNB and the UE. In the first time slot, the two received signals cannot be separately processed because the signals transmitted from the eNB and the UE are simultaneously received by the RS. Accordingly, the RS uses a Maximum Likelihood Decision (MLD) method in order to distinguish the signals, overlapped with each other as described above, from the signals transmitted from the eNB and the UE, respectively.

In the case in which the RS decides the signals transmitted from the eNB and the UE using an M-ary modulation method, however, the relay cooperative communication system using CFNC has a disadvantage in that actual implementation is difficult because a computational load is sharply increased if a high-order modulation method is used because the MLD method having computational complexity of $O(M^2)$ is used.

The MLD method is a demodulation method theoretically having the best performance and is a method of taking combinations of pieces of information that may be transmitted from a transmission apparatus into consideration, applying the combinations to respective estimated channel characteristic matrices, and finding a combination of first transmission signals having the most similar result as received signals from among the results. Accordingly, the MLD method has not side effect, such as a noise rise, in terms of an information theory and shows better performance than other demodulation methods. The MLD method, however, has a disadvantage in that a computational load increases by geometrical progression according to an increase in the complexity of the modulation method. For example, if a transmission apparatus uses a modulation method of 64QAM, a combination of signals that may be transmitted by the transmission apparatus is 64×64. It is substantially difficult to review the combination of the signals in real time for each symbol period.

FIG. 1 is a conceptual diagram showing the operation of a conventional relay cooperative communication system using CFNC.

Referring to FIG. 1, the relay cooperative communication system using CFNC includes an eNB 10, an RS 20, and UE 30.

First, in a first time slot, the eNB 10 and the UE 30 transmit signals x1 and x2 to the RS 20 at the same time. The RS 20 that has received the signals from the eNB 10 and the UE 30 at the same time decides the signals transmitted from the eNB 10 and the UE 30 by using an MLD method because it cannot separately process the received mixed signal.

Next, the RS 20 generates one signal $x_{RS}$ from the decided signals by using CFNC and transmits the signal $x_{RS}$, generated in a second time slot, to the eNB 10 and the UE 30.

Here, the eNB 10 and the UE 30 receive signals, such as those described in Equation 1 below.

$$\begin{cases} Y_{eNB}[k] = H_{RS-eNB}[k]X_{RS}[k] + N_{eNB}[k], & eNB \\ Y_{UE}[k] = H_{RS-UE}[k]X_{RS}[k] + N_{UE}[k], & UE \end{cases} \quad \text{Equation 1}$$

In Equation 1 above, $Y_{eNB}[k]$ refers to the signal transmitted from the RS 20 and received by the eNB 10, $H_{RS-eNB}[k]$ refers to a Channel Frequency Response (CFR) between the RS 20 and the eNB 10, and $N_{eNB}[k]$ refers to the Additive White Gaussian Noise (AWGN) of the eNB 10. Furthermore, $Y_{UE}[k]$ refers to the signal transmitted from the RS 20 and received by the UE 30, $H_{RS-UE}[k]$ refers to a CRF between the RS 20 and the UE 30, and $N_{UE}[k]$ refers to the AWGN of the UE 30. $X_{RS}[k]$ refers to the signal transmitted from the RS 20.

Next, the eNB estimates the signal, transmitted from the UE, by using the received signal and the signal transmitted by the eNB in accordance with a Maximum Likelihood Decision (MLD) method, such as those listed in Equation 2 below, and the UE estimates the signal transmitted from the eNB by using the received signal and the signal transmitted by the eNB.

$$\begin{cases} \hat{X}_{UE}[k] = X_{UE,i} = \min_{X_{UE,i} \in A} \begin{pmatrix} Y_{eNB}[k] - \\ H_{RS-eNB}[k]X_{eNB}[k] - \\ H_{RS-eNB}[k]X_{UE,i} \end{pmatrix}, eNB \\ \hat{X}_{eNB}[k] = X_{eNB,i} = \min_{X_{eNB,i} \in A} \begin{pmatrix} Y_{UE}[k] - \\ H_{RS-UE}[k]X_{UE}[k] - \\ H_{RS-UE}[k]X_{eNB,i} \end{pmatrix}, UE \end{cases} \quad \text{Equation 2}$$

In Equation 2 above, A refers to M signals according to an M-ary modulation method. Furthermore, $X_{eNB}[k]$ refers to the signal transmitted from the eNB 10, $X_{UE}[k]$ refers to the signal transmitted from the UE 30, and $\hat{X}_{eNB}[k]$ and $\hat{X}_{UE}[k]$ refer to the respective estimated values of the signals transmitted from the eNB 10 and the UE 30.

FIG. 2 is a block diagram showing the construction of the RS using a conventional MLD method.

Referring to FIG. 2, the reception antenna 21 of the RS 20 simultaneously receives signals transmitted from the eNB 10 and the UE 30. Here, the signal received by the reception antenna 21 is a signal, such as that listed in Equation 3.

$$y_{RS}[n] = h_{eNB-RS}[n] * x_{eNB}[n] + h_{UE-RS}[n] * x_{UE}[n] + n_{RS}[n] \quad \text{Equation 3}$$

In Equation 3, $y_{Ss}[n]$ refers to the signal received by the RS 20, $h_{eNb-RS}[n]$ refers to a Channel Impulse Response (CIR) between the eNB 10 and the RS 20, and $x_{eNB}[n]$ refers to the signal transmitted from the eNB 10. Furthermore, $h_{UE-RS}[n]$ refers to a CIR between the UE 30 and the RS 20, $n_{RS}[n]$ refers to the AWGN of the RS 30, and $x_{UE}[n]$ refers to the signal transmitted from the UE 30.

A guard interval removal unit 22 removes the guard interval of the signal received by the reception antenna 21 as in Equation 3. An FFT unit 23 transforms the signal from which the guard interval has been removed into a signal of a frequency domain through a Fast Fourier Transform (FFT) process.

Next, an MLD unit 24 performs MLC for the signal transformed into the frequency domain as described above. In general, the RS 20 can estimate a CIR and a CFR, and the MLD unit 24 performing MLD for the estimated CFR includes an operation unit for calculating a correlation value as in Equation 4 and a comparison unit for determining a minimum value.

$$\{\hat{X}_{eNB}[k], \hat{X}_{UE}[k]\} = \min_{X_{eNB,i}, X_{UE,i} \in A} |Y_{RS}[k] - H_{eNB-RS}[k]X_{eNB,i} - H_{UE-RS}[k]X_{UE,i}|^2 \quad \text{Equation 4}$$

In Equation 4 above, A refers to M signals according to an M-ary modulation method. Furthermore, $Y_{RS}[k]$ refers to the signals received by the RS 20, $H_{eNB-RS}[k]$ refers to a CFR between the eNB 10 and the RS 20. and $H_{UE-RS}[k]$ refers to a CFR between the UE 30 and the RS 20. Furthermore, $\hat{X}_{eNB}[k]$ and $\hat{X}_{UE}[k]$ refer to the respective estimated values of the signals transmitted from the eNB 10 and the UE 30.

A Complex Field Network Coding (CFNC) unit 25 calculates a complex addition signal from the two signals (i.e., $\hat{X}_{eNB}[k]$ and $\hat{X}_{UE}[k]$), decided using Equation 4, by using Equation 5.

$$X_{RS}[k] = W_{eNB}[k] \cdot \hat{X}_{eNB}[k] + W_{UE}[k] \cdot \hat{X}_{UE}[k] \quad \text{Equation 5}$$

In Equation 5, $X_{RS}[k]$ refers to the signal transmitted from the RS 20, and $W_{eNB}[k]$ and $W_{UE}[k]$ refer to weights (e.g., phase change values) applicable in various ways.

An Inverse Fast Fourier Transform (IFFT) unit 26 performs an IFFT for the signal (i.e., $X_{RS}[k]$) generated in accordance with Equation 5 above, and a guard interval insertion unit 27 inserts guard intervals into the signal subjected to the IFFT. Furthermore, a transmission antenna 28 transmits the signal, provided from the guard interval insertion unit 27, to the eNB 10 and the UE 30.

FIG. 3 is a constellation diagram showing 16QAM signal pairs which are used in the conventional MLD method.

Referring to FIG. 3, $X_i$ indicates 16 signals which are all the 16QAM signals transmitted from an $X_{eNB}$, and $X_j$ indicates 16 signals which are 16QAM signals of an $X_{UE}$.

As shown in FIG. 3, since the number of $\{X_i, X_j\}$ signal pairs is $16^2$, the conventional MLD method of calculating all the signal pairs and then deciding the $X_{eNB}$ and the $X_{UE}$ by calculating a minimum value requires a total of 256 calculation processes. Alternatively, if an eNB and UE use 64QAM, the conventional MLD method requires a total of 4096 calculation processes because the number of $\{X_i, X_j\}$ signal pairs is $64^2$. Accordingly, a computational load sharply increases.

A demodulation method using the conventional MLD method as described above has a disadvantage in that actual implementation is difficult because a computational load increases in geometrical progression as a high-order modulation method is used.

SUMMARY

Therefore, example embodiments of the present invention are to provide methods of demodulating received signals, which is capable of reducing computational complexity while maintaining the quality of the signals.

Furthermore, example embodiments of the present invention are also to provide reception apparatuses performing the method of demodulating received signals.

In some example embodiments, a demodulation method of a reception apparatus for receiving a plurality of signals modulated according to an M-ary (wherein M is a natural number of 1 or more) modulation method includes comparing Channel Frequency Response (CFR) power of a first channel with Channel Frequency Response (CFR) power of a second channel; selecting M reference signals based on a result of the comparison of the Channel Frequency Response (CFR) powers; selecting corresponding signals paired with respective selected M reference signals; and estimating transmission signals from the M signal pairs including pairs of the reference signal and the corresponding signal. The selecting M reference signals based on a result of the comparison of the Channel Frequency Response (CFR) powers may include selecting a signal transmitted through a channel as the reference signal, the channel being selected among a first channel and a second channel such that the channel has the smallest Channel Frequency Response (CRF) power among the first channel and the second channel. The selecting corresponding signals paired with respective selected M reference signals may include deciding the corresponding signals through Equation $X_{2,i} = (Y - H_1 X_{1,i})/H_2$, wherein $X_{1,i}$ refers to a specific reference signal selected from among M signals, $X_{2,i}$ refers to the corresponding signal of the reference signal, and $H_1$ and $H_2$ refer to Channel Frequency Response (CFR), and Y refers to the received signal received by the reception apparatus. The selecting corresponding signals paired with respective selected M reference signals may include removing noise components of the decided corresponding signals. The estimating transmission signals from the M signal pairs including pairs of the reference signal and the corresponding transmission signals through Equation $$\{\hat{X}_1, \hat{X}_2\} = \min_{X_{1,i}, X_{2,i} \in A} |Y - H_1 X_{1,i} - H_2 X_{2,i}|^2,$$

wherein A refers to the M signal pair, $X_{1,i}$ refers to a specific reference signal selected from among M signals, $X_{2,i}$ refers to the corresponding signal of the reference signal, $H_1$ and $H_2$ refer to Channel Frequency Response (CFR), Y refers to the received signal received by the reception apparatus, and $\hat{X}_1$ and $\hat{X}_2$ refer to the estimated transmission signals.

In other example embodiments, a demodulation apparatus includes a Fast Fourier Transform (FFT) unit for transforming received signals into a frequency domain by performing Fast Fourier Transform (FFT) on the received signals; and a Maximum Likelihood Decision (MLD) unit for comparing a Channel Frequency Response (CFR) power of a first channel with a Channel Frequency Response (CFR) power of a second channel, for selecting M reference signals based on a result of the comparison of the Channel Frequency Response (CFR) powers, and for estimating transmission signals from M signal pairs, each of M signal pairs including a respective selected M reference signal and a corresponding signal paired with the respective selected M reference signal, the M signal pairs being obtained by deciding corresponding signals paired with the respective selected M reference signals, M being a natural number of one or more. The MLD unit may select a signal transmitted through a channel as the reference signal, the channel being selected among a first channel and a second channel such that the channel has the smallest Channel Frequency Response (CRF) power among the first channel and the second channel. The MLD unit may decide the corresponding signals through Equation $X_{2,i}=(Y-H_1 X_{1,i})/H_2$, wherein $X_{1,i}$ refers to a specific reference signal selected from among M signals, $X_{2,i}$ refers to the corresponding signal of the reference signal, and $H_1$ and $H_2$ refer to Channel Frequency Response (CFR), and Y refers to the received signal received by the reception apparatus. The MLD unit may remove noise components of the decided corresponding signals. The MLD unit may estimate the transmission signals through Equation $$\{\hat{X}_1, \hat{X}_2\} = \min_{X_{1,i}, X_{2,i} \in A} |Y - H_1 X_{1,i} - H_2 X_{2,i}|^2,$$

wherein A refers to the M signal pair, $X_{1,i}$ refers to a specific reference signal selected from among the M signals, $X_{2,i}$ refers to the corresponding signal of the reference signal, $H_1$ and $H_2$ refer to Channel Frequency Response (CFR), Y refers to the received signal received by the reception apparatus, and $\hat{X}_1$ and $\hat{X}_2$ refer to the estimated transmission signals.

In accordance with the example embodiments of the present invention, if M-ary modulation is used on the transmitter side, only M signal pairs have only to be considered without considering $M^2$ signal pairs as in the conventional method of demodulating received signals because M reference signals are first selected on the basis of Channel Frequency Response (CFR) power and corresponding signals paired with the selected M reference signals are then decided as described above.

Accordingly, computational complexity for estimating transmission signals from received signals can be reduced from conventional $O(M^2)$ to $O(M)$. Furthermore, since computational complexity is reduced, signal processing delay in a reception apparatus can be prevented, and complexity in a modem can be reduced.

DETAILED DESCRIPTION

Figure 1:
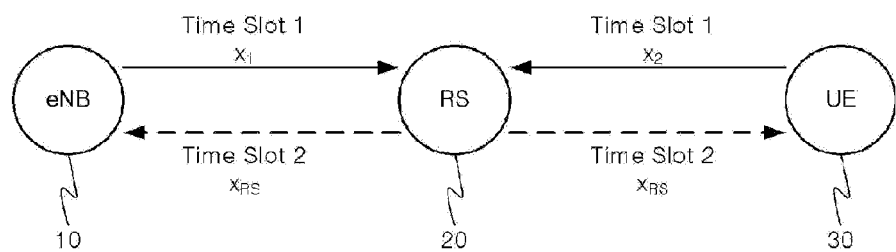
FIG. 1 is a conceptual diagram showing the operation of a conventional relay cooperative communication system using CFNC.
Figure 2:
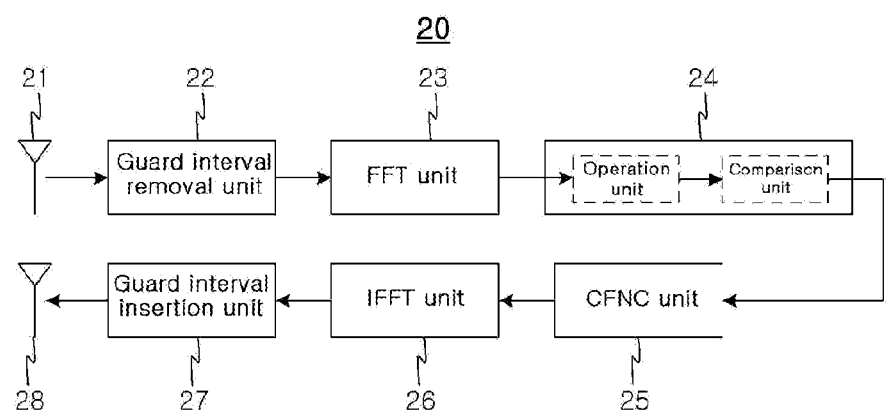
FIG. 2 is a block diagram showing the construction of an RS using a conventional MLD method.
Figure 3:
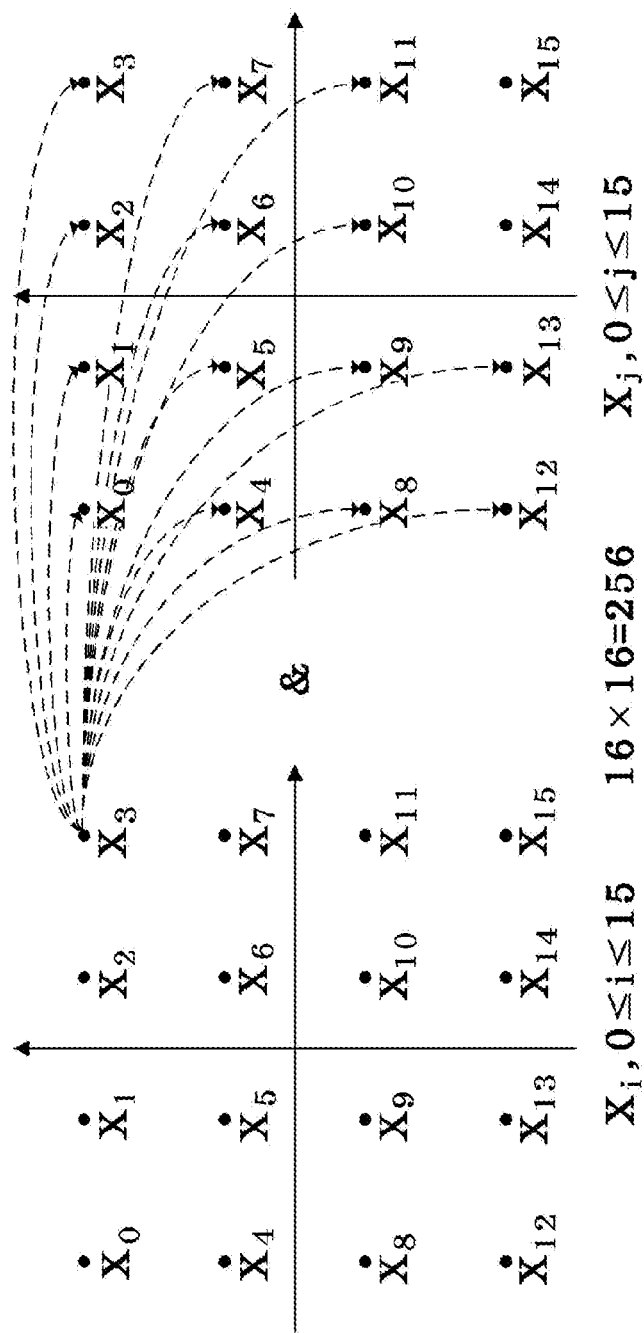
FIG. 3 is a constellation diagram showing signal pairs of 16QAM which are used in a conventional MLD method.

The present invention may be modified in various ways and may have some embodiments. Hereinafter, specific embodiments of the present invention will be illustrated in the drawings and will be described in detail in the detailed description. However, the present invention is not intended to be limited to the specific embodiments, and it should be understood that the present invention includes all modifications, equivalents, or substitutions which fall within the spirit and technical scope of the present invention. The same reference numbers are used throughout the drawings to refer to the same or like parts.

Terms, such as the first and the second, may be used to describe various elements, but the elements should not be restricted by the terms. The terms are used to only distinguish one element and the other element from each other. For example, a first element may be named a second element without departing from the scope of the present invention. Likewise, a second element may be named a first element. A term, such as and/or, includes a combination of a plurality of pertinent and described items or any one of a plurality of pertinent and described items.

If one element is described to be "connected" or "coupled" to the other element, the one element may be directly connected or coupled to the other element, but it should be understood that a third element may exist between the two elements. On the other hand, if one element is described to be "directly connected" or "directly coupled" to the other element, it should be understood that a third element does not exist between the two elements.

The terms used in this application are used to only describe the specific embodiments and are not intended to restrict the present invention. An expression of the singular number includes an expression of the plural number, unless clearly defined otherwise in the context. In this application, terms, such as "comprise" or "have", are intended to designate that characteristics, numbers, steps, operations, elements, or parts which are described in the specification, or a combination of them exist, and should be understood that they, do not exclude the existence or possible addition of one or more other characteristics, numbers, steps, operations, elements, parts, or combinations of them in advance.

Hereinafter, preferred embodiments of the present invention will be described in detail with reference to the accompanying drawings. The same reference numerals designate the same elements throughout the drawings, and a redundant description of the same elements is omitted.

Hereinafter, in embodiments of the present invention, an RS refers to an apparatus placed between an eNB and UE and configured to receive signals transmitted from the eNB and the UE and to relay the received signals to the eNB and the UE.

Figure 4:
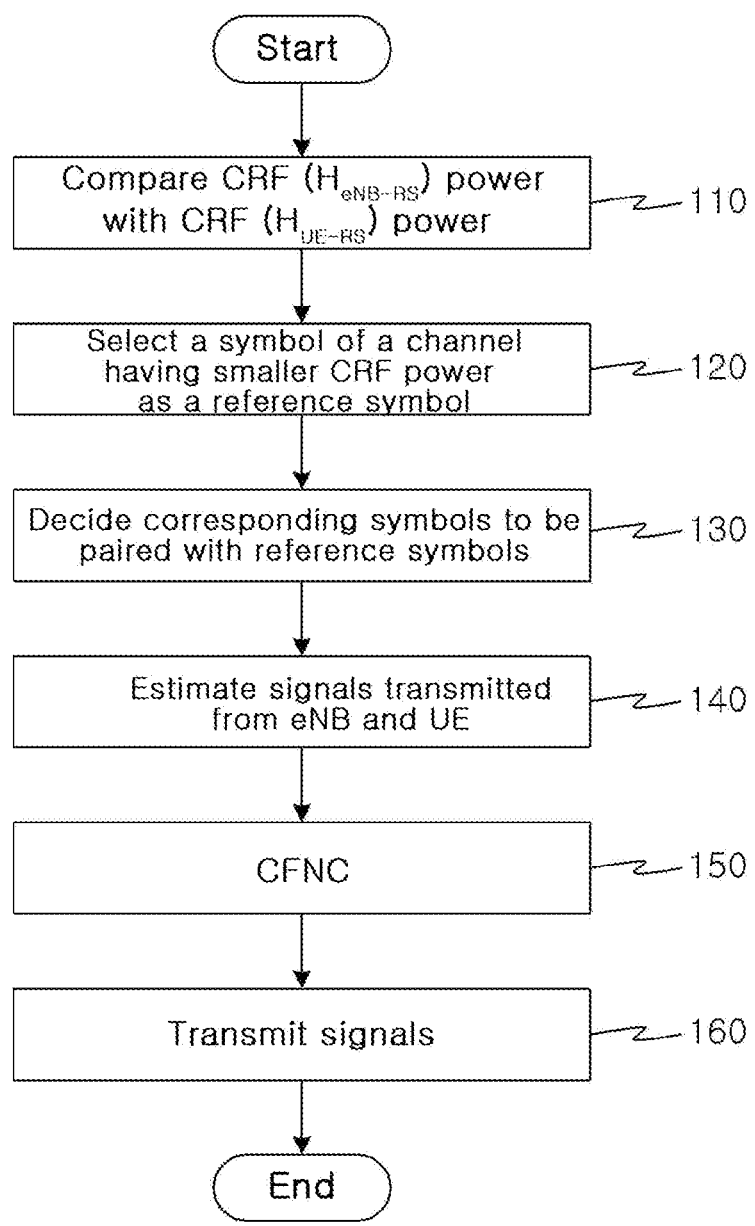
FIG. 4 is a flowchart showing a method of demodulating received signals according to an example embodiment of the present invention.

FIG. 4 is a flowchart showing a method of demodulating received signals according to an example embodiment of the present invention. A Maximum Likelihood Decision (MLD) method performed in an RS performing relay cooperative communication based on Complex Field Network Coding (CFNC) is shown as an example.

Referring to FIG. 4, first, the RS compares CRF ($H_{eNB-RS}$) power between the eNB and the RS with CRF ($H_{UE-RS}$) power between the RS and the UE (step 110).

Next, the RS selects a signal of a channel having smaller CRF power as a reference signal on the basis of the result of the comparison of the CFR powers (step 120). Here, the reason why the signal of the channel having smaller CRF power is selected as the reference signal is to minimize an influence occurring when the reference signal is erroneously selected. A signal of a channel having greater CFR power may be selected as the reference signal.

Furthermore, the RS decides a corresponding signal that will be paired with the selected reference signal by using Equations 6 and 7.

$$\begin{cases} X_{UE,i} = \dfrac{(Y_{RS}[k] - H_{eNB-RS}[k]X_{eNB,i})}{H_{UE-RS}[k]}, & \text{if } \dfrac{|H_{eNB-RS}[k]|^2 <}{|H_{UE-RS}[k]|^2} \\ X_{eNB,i} = \dfrac{(Y_{RS}[k] - H_{UE-RS}[k]X_{UE,i})}{H_{eNB-RS}[k]}, & \text{if } \dfrac{|H_{eNB-RS}[k]|^2 >}{|H_{UE-RS}[k]|^2} \end{cases} \quad \text{Equation 6}$$

In Equation 6, $Y_{RS}[k]$ refers to a received signal received by the RS, $H_{eNB-RS}[k]$ refers to a CFR between the eNB and the RS, and $H_{UE-RS}[k]$ refers to a CFR between the UE and the RS. Furthermore, $X_{eNB,i}$ refers to a specific signal transmitted from the eNB, from among M signals, and $X_{UE,i}$ refers to a specific signal transmitted from the UE, from among the M signals.

$$\begin{cases} X_{UE,i} = dec\left(\dfrac{X_{UE,i} + N_{RS}[k]}{H_{UE-RS}[k]}\right), & \text{if } \dfrac{|H_{eNB-RS}[k]|^2 <}{|H_{UE-RS}[k]|^2} \\ X_{eNB,i} = dec\left(\dfrac{X_{eNB,i} + N_{RS}[k]}{H_{eNB-RS}[k]}\right), & \text{if } \dfrac{|H_{eNB-RS}[k]|^2 >}{|H_{UE-RS}[k]|^2} \end{cases} \quad \text{Equation 7}$$

In Equation 7, dec refers to the decision of the relevant signal to be paired with the reference signal. Noise components remaining in the corresponding signal selected through Equation 6 can be removed using Equation 7.

For example, if the CRF ($H_{eNB-RS}$) power between the eNB and the RS is smaller than the CRF ($H_{UE-RS}$) power between the RS and the UE, the specific signal $X_{eNB,i}$ transmitted from the eNB, from among the M signals, is selected as the reference signal, and the corresponding signal (i.e., $X_{UE,i}$) to be paired with the selected reference signal is decided using Equations 6 and 7.

Alternatively, if the CRF ($H_{UE-RS}$) power between the RS and the UE is smaller than the CRF ($H_{eNB-RS}$) power between the eNB and the RS, the specific signal $X_{UE,i}$ transmitted from the UE, from among the M signals, is selected as the reference signal, and the corresponding signals (i.e., $X_{eNB,i}$) to be paired with the selected reference signal is decided using Equations 6 and 7.

After the M signal pairs are decided through the steps 110 to 130, the RS estimates the signals transmitted from the eNB and the UE by using Equation 8 (step 140).

$$\{\hat{X}_{eNB}[k], \hat{X}_{UE}[k]\} = \quad \text{Equation 8}$$
$$\min_{X_{eNB,i}, X_{UE,i} \in A} |Y_{RS}[k] - H_{eNB-RS}[k]X_{eNB,i} - H_{UE-RS}[k]X_{UE,i}|^2$$

In Equation 8, A refers to M $\{X_{eNB,i}, X_{UE,i}\}$ signal pairs consisting of the M $X_{eNB,i}$ signals according to the M-ary modulation method and the specific signal $X_{UE,i}$. Furthermore, $Y_{RS}[k]$ refers to the signal received by the RS, and $\hat{X}_{eNB}[k]$ and $\hat{X}_{UE}[k]$ refer to the respective estimated values of the signals transmitted from the eNB and the UE.

Next, the RS performs CFNC for the signals estimated at step 140 (step 150) and then transmits the estimated signals to the eNB and the UE (step 160). Here, the RS may perform CFNC for the signals estimated using Equation 5.

As shown in FIG. 4, in the method of demodulating received signals according to the example embodiment of the present invention, if M-ary modulation is used on the transmitter side, only M signal pairs have only to be taken into consideration without taking $M^2$ signal pairs into consideration as in the conventional method of demodulating received signals because M reference signals are first selected on the basis of Channel Frequency Response (CFR) power and corresponding signal paired with the selected M reference signals are then decided as described above. Accordingly, computational complexity can be reduced from conventional $O(M^2)$ to $O(M)$.

Figure 5:
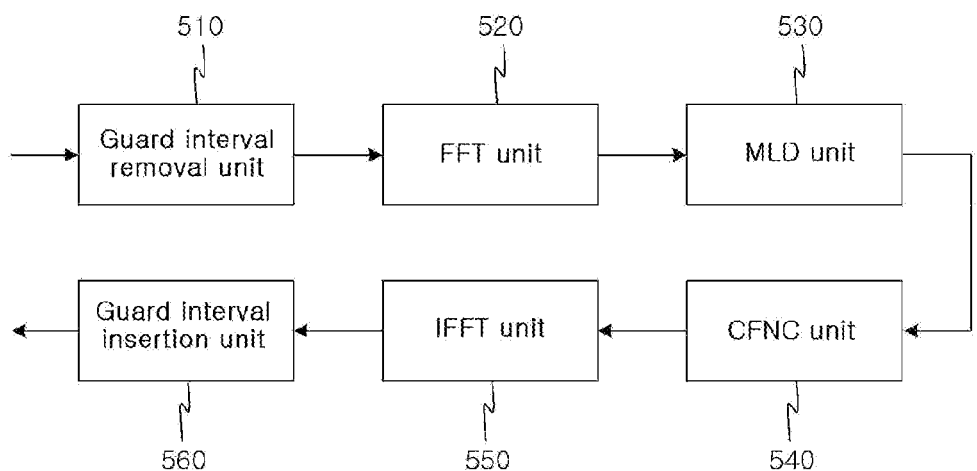
FIG. 5 is a block diagram showing the construction of a reception apparatus performing the method of demodulating received signals according to an example embodiment of the present invention.
Figure 6:
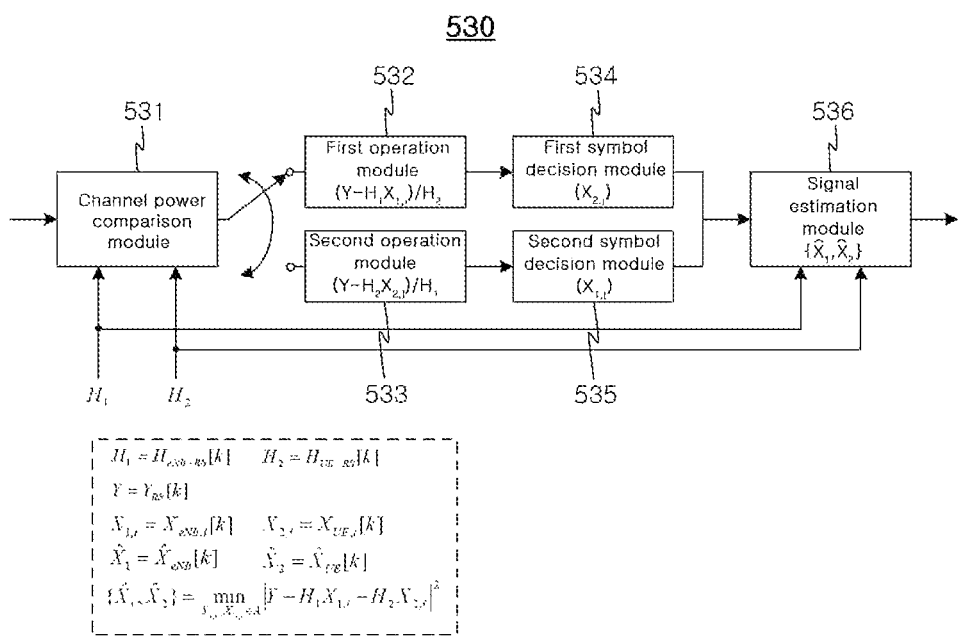
FIG. 6 is a block diagram showing a detailed construction of an MLD unit shown in FIG. 5.

FIG. 5 is a block diagram showing the construction of a reception apparatus performing the method of demodulating received signals according to an example embodiment of the present invention, and FIG. 6 is a block diagram showing a detailed construction of an MLD unit shown in FIG. 5. In FIG. 5, an RS is shown as the apparatus for performing the method of demodulating received signals as an example.

Referring to FIGS. 5 and 6, the reception apparatus according to the example embodiment of the present invention may include a guard interval removal unit 510, an FFT unit 520, an MLD unit 530, a CFNC unit 540, an IFFT unit 550, and a guard interval insertion unit 560.

The guard interval removal unit 510 removes the guard interval of a received signal. The FFT unit 520 transforms the signal from which the guard interval has been removed into a frequency domain signal by performing an FFT.

The MLD unit 530 may include a channel power comparison module 531, a first operation module 532, a second operation module 533, a first signal decision module 534, a second signal decision module 535, and a signal estimation module 536.

The channel power comparison module 531 compares the CRF ($H_{eNB-RS}$) power between the eNB and the RS with the CRF ($H_{UE-RS}$) power between the RS and the UE.

If the CRF ($H_{eNB-RS}$) power is smaller than the CRF ($H_{UE-RS}$) power on the basis of the result of the comparison of the channel power comparison module 531, the first operation module 532 and the first signal decision module 534 are operated. If the CRF ($H_{UE-RS}$) power is smaller than the CRF ($H_{eNB-RS}$) power, the second operation module 533 and the second signal decision module 535 are operated.

The first operation module 532 selects the specific signal, transmitted from the eNB, as the reference signal $X_{eNB,i}$ and calculates the corresponding signal $X_{UE,i}$ to be paired with the selected reference signal $X_{eNB,i}$ by using Equation 6.

The first signal decision module 534 removes noise components remaining in the corresponding signal $X_{UE,i}$, selected by the calculation of the first operation module 532, from the corresponding signal by using Equation 7.

The second operation module 533 selects the specific signal, transmitted from the UE, as the reference signal $X_{UE,i}$ and calculates the corresponding signal $X_{eNB,i}$ to be paired with the selected reference signal $X_{UE,i}$ by using Equation 6.

The second signal decision module 535 removes noise components remaining in the corresponding signal $X_{eNB,i}$, selected by the calculation of the second operation module 533, from the corresponding signal $X_{eNB,i}$ by using Equation 7.

The signal estimation module 536 receives a total of decided M signal pairs from the first signal decision module 534 or the second signal decision module 535 and estimates signals transmitted from the eNB and the UE, from among the M signal pairs, by using Equation 8.

The CFNC unit 540 generates a complex addition signal of the estimated signals by using Equation 5, and the IFFT unit 550 performs an IFFT for the signal subjected to the CFNC.

The guard interval insertion unit 560 inserts guard intervals into the signal subjected to the IFFT.

The construction of the RS has been described as the apparatus performing the method of demodulating received signals with reference to FIGS. 5 and 6, but it is obvious that the MLD unit may be applied to a receiver for receiving a signal in which a plurality of signals is mixed and for separating the received signal. For example, the MLD unit may be used in a relay cooperative communication environment using GFNC and may be used in a Multiple Input Multiple Output (MIMO) receiver of a multi-antenna environment.

FIG. 7 is a constellation diagram illustrating signal pairs of 16QAM in an MLD method according to an example embodiment of the present invention.

Figure 7A:
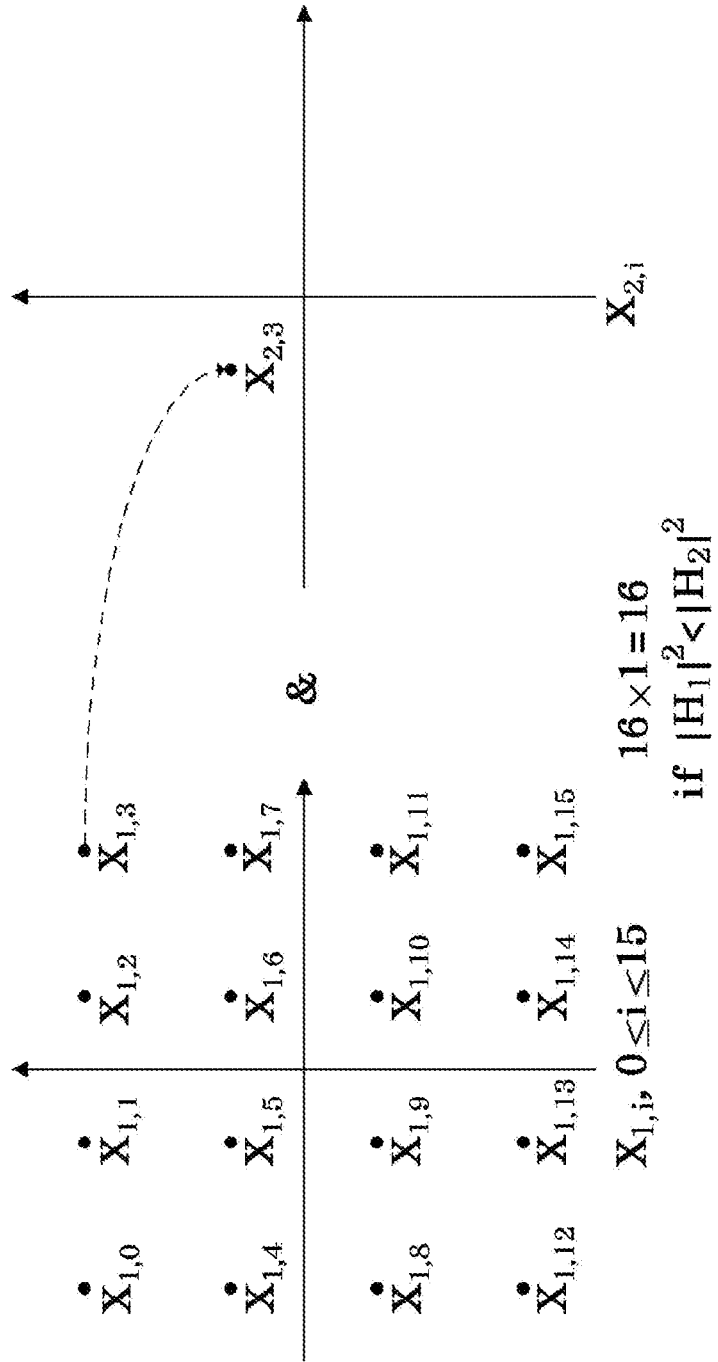
FIG. 7 is a constellation diagram illustrating signal pairs of 16QAM in an MLD method according to an example embodiment of the present invention.

FIG. 7a shows that $X_{2,i}(=X_{UE,i})$ is decided on the basis of a signal $X_{1,i}(=X_{eNB,i})$ when CRF ($H_1=H_{eNB-RS}$) power is smaller than CRF ($H_2=H_{UE-RS}$) power, and FIG. 7b shows that $X_{1,i}(=X_{eNB,i})$ is decided on the basis of a signal $X_{2,i}(=X_{UE,i})$ when the CFR power ($H_2=H_{UE-RS}$) is smaller than the CRF ($H_1=H_{eNB-RS}$) power.

Accordingly, in the MLD method according to the example embodiment of the present invention, in case of 16QAM, only a total of 16 signal pairs $\{X_{1,i}, X_{2,i}\}$ are taken into consideration, and thus 16 calculation processes are necessary. This means that a computational load is significantly reduced as compared to a conventional computational load of $16^2$.

Figure 8:
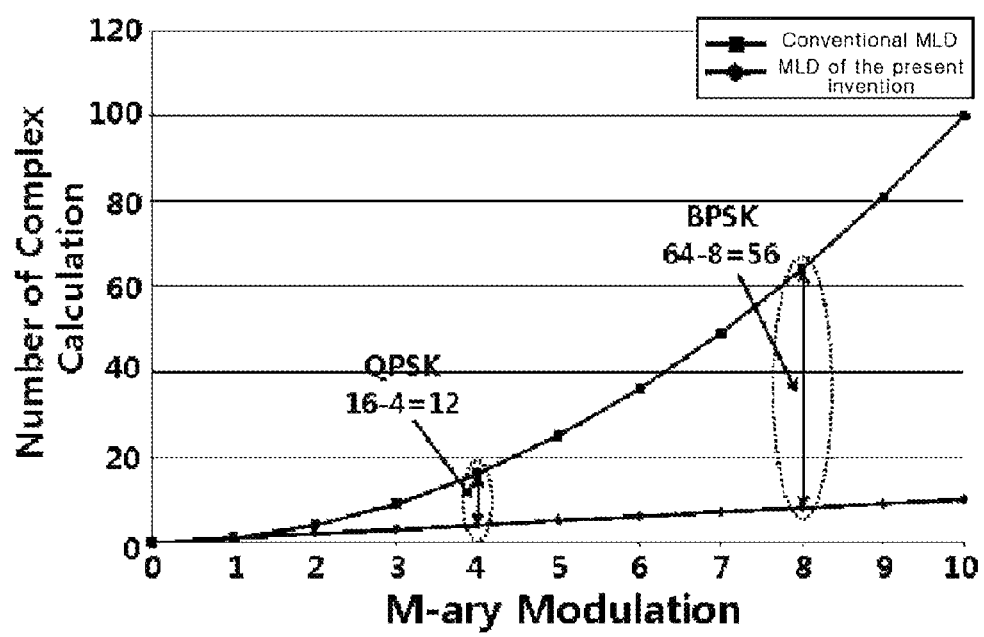
FIG. 8 is a graph showing the result of a comparison between computational loads of the MLD method according to the example embodiment of the present invention and the conventional MLD method.

FIG. 8 is a graph showing the result of a comparison between computational loads of the MLD method according to the example embodiment of the present invention and the conventional MLD method.

As shown in FIG. 8, in the MLD method of an example embodiment of the present invention, when a modulation order increases, a computational load linearly increases according to the increase of the order because the computational load is O(M). In the conventional MLD method, however, when a modulation order increases, a computational load increases in the form of a square of the order because the computational load is $O(M^2)$. Accordingly, as higher-order modulation is used, the MLD method of an example embodiment of the present invention can reduce a greater computational load as compared to the conventional MLD method.

Figure 9:
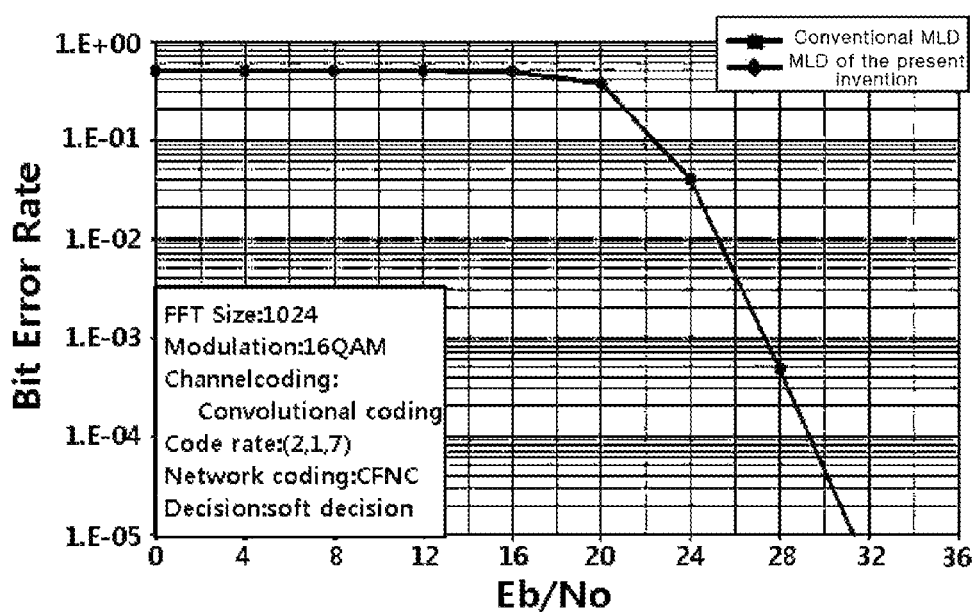
FIG. 9 is a graph showing the result of a comparison between the bit error rates of the MLD method according to the example embodiment of the present invention and the conventional MLD method.

FIG. 9 is a graph showing the result of a comparison between the bit error rates of the MLD method according to the example embodiment of the present invention and the conventional MLD method.

Referring to FIG. 9, a simulation experiment for verifying the Bit Error Rate (BER) performance of the MLD method according to the example embodiment of the present invention was performed by setting 16QAM according to a modulation method, using convolutional coding using soft decision as channel coding, and recording statistical performance numerical values through sufficiently lots of repetition processes in an exponential decay channel environment.

As shown in FIG. 9 it was found that the MLD method according to the example embodiment of the present invention did not have any deterioration in the BER performance as compared to the conventional MLD method.

Consequently, as shown in FIGS. 8 and 9, the MLD method and the demodulation method using the same according to the example embodiment of the present invention are advantageous in that they can significantly reduce a computational load while maintaining quality as compared to the demodulation method using the conventional MLD method.

Although the embodiments have been described above, a person having ordinary skill in the art will appreciate that the present invention may be modified and changed in various ways without departing from the spirit and scope of the present invention.

The invention claimed is:

1. A demodulation method of a reception apparatus for receiving a plurality of signals modulated according to an M-ary modulation method, wherein M is a natural number of one or more, the demodulation method comprising:
    comparing Channel Frequency Response (CFR) power of a first channel with Channel Frequency Response (CFR) power of a second channel;
    selecting M reference signals based on a result of the comparison of the Channel Frequency Response (CFR) powers;
    selecting corresponding signals paired with respective selected M reference signals; and
    estimating transmission signals from the M signal pairs including pairs of the reference signal and the corresponding signal.

2. The demodulation method of claim 1, wherein the selecting M reference signals based on a result of the comparison of the Channel Frequency Response (CFR) powers includes selecting a signal transmitted through a channel as the reference signal, the channel being selected among the first channel and the second channel such that the channel has the smallest Channel Frequency Response (CRF) power among the first channel and the second channel.

3. The demodulation method of claim 1, wherein the selecting corresponding signals paired with respective selected M reference signals includes deciding the corresponding signals through Equation $X_{2,i}=(Y-H_1 X_{1,i})/H_2$, wherein $X_1$ refers to a specific reference signal selected from among M signals, $X_{2,i}$ refers to the corresponding signal of the reference signal, and $H_1$ and $H_2$ refer to Channel Frequency Response (CFR), and Y refers to the received signal received by the reception apparatus.

4. The demodulation method of claim 3, wherein the selecting corresponding signals paired with respective selected M reference signals includes removing noise components of the decided corresponding signals.

5. The demodulation method of claim 1, wherein the estimating transmission signals from the M signal pairs including pairs of the reference signal and the corresponding signal includes estimating the transmission signals through Equation $$\{\hat{X}_1, \hat{X}_2\} = \min_{X_{1,i}, X_{2,i} \in A} |Y - H_1 X_{1,i} - H_2 X_{2,i}|^2,$$

wherein A refers to the M signal pair, $X_1$ refers to a specific reference signal selected from among M signals, $X_{2,i}$ refers to the corresponding signal of the reference signal, $H_1$ and $H_2$ refer to Channel Frequency Response (CFR), Y refers to the received signal received by the reception apparatus, and $\hat{X}_1$ and $\hat{X}_2$ refer to the estimated transmission signals.

6. A demodulation apparatus, comprising:
a Fast Fourier Transform (FFT) unit for transforming received signals into a frequency domain by performing Fast Fourier Transform (FFT) on the received signals; and
a Maximum Likelihood Decision (MLD) unit for comparing a Channel Frequency Response (CFR) power of a first channel with a Channel Frequency Response (CFR) power of a second channel, for selecting M reference signals based on a result of the comparison of the Channel Frequency Response (CFR) powers, and for estimating transmission signals from M signal pairs, each of M signal pairs including a respective selected M reference signal and a corresponding signal paired with the respective selected M reference signal, the M signal pairs being obtained by deciding corresponding signals paired with the respective selected M reference signals, M being a natural number of one or more.

7. The demodulation apparatus of claim 6, wherein the MLD unit selects a signal transmitted through a channel as the reference signal, the channel being selected among the first channel and the second channel such that the channel has the smallest Channel Frequency Response (CRF) power among the first channel and the second channel.

8. The demodulation apparatus of claim 6, wherein the MLD unit decides the corresponding signals through Equation $X_{2,i}=(Y-H_1 X_{1,i})/H_2$, wherein $X_{1,i}$ refers to a specific reference signal selected from among M signals, $X_2$ refers to the corresponding signal of the reference signal, and $H_1$ and $H_2$ refer to Channel Frequency Response (CFR), and Y refers to the received signal received by the reception apparatus.

9. The demodulation apparatus of claim 8, wherein the MLD unit removes noise components of the decided corresponding signals.

10. The demodulation apparatus of claim 6 wherein the MLD unit estimates the transmission signals through Equation $$\{\hat{X}_1, \hat{X}_2\} = \min_{X_{1,i}, X_{2,i} \in A} |Y - H_1 X_{1,i} - H_2 X_{2,i}|^2,$$

wherein A refers to the M signal pair, $X_{1,i}$ refers to a specific reference signal selected from among the M signals, $X_{2,i}$ refers to the corresponding signal of the reference signal, $H_1$ and $H_2$ refer to Channel Frequency Response (CFR), Y refers to the received signal received by the reception apparatus, and $\hat{X}_1$ and $\hat{X}_2$ refer to the estimated transmission signals.

* * * * *